US00RE45363E

(19) United States
(12) Reissued Patent
Lemilainen et al.

(10) Patent Number: US RE45,363 E
(45) Date of Reissued Patent: Feb. 3, 2015

(54) METHOD AND APPARATUS FOR NETWORK ACCESS

(71) Applicant: Broadcom Corporation, Irvine, CA (US)

(72) Inventors: Jussi Lemilainen, Oulu (FI); Timo Koskela, Oulu (FI); Sami-Jukka Hakola, Kempele (FI); Samuli Turtinen, Ii (FI); Kari Rikkinen, Ii (FI)

(73) Assignee: Broadcom Corporation, Irvine, CA (US)

(21) Appl. No.: 14/165,036

(22) Filed: Jan. 27, 2014

Related U.S. Patent Documents

Reissue of:
(64) Patent No.: 8,594,631
Issued: Nov. 26, 2013
Appl. No.: 13/357,140
Filed: Jan. 24, 2012

(30) Foreign Application Priority Data

Jan. 18, 2012 (GB) ..... 1200772.0

(51) Int. Cl.
*H04W 12/00* (2009.01)
*H04M 1/66* (2006.01)

(52) U.S. Cl.
USPC ..... 455/411; 455/435.1

(58) Field of Classification Search
USPC ..... 455/410–411, 414.1–414.4, 418–419, 455/435.1–435.3
See application file for complete search history.

(56) References Cited

U.S. PATENT DOCUMENTS

| | | | | |
|---|---|---|---|---|
| 2003/0027581 | A1* | 2/2003 | Jokinen et al. | 455/456 |
| 2009/0163175 | A1 | 6/2009 | Shi et al. | 455/411 |
| 2011/0035584 | A1 | 2/2011 | Meyerstein et al. | |

FOREIGN PATENT DOCUMENTS

| | | | |
|---|---|---|---|
| EP | 2 015 537 | A1 | 1/2009 |
| WO | WO 2006/013150 | A1 | 2/2006 |
| WO | WO 2012042300 | A1 * | 4/2012 |

OTHER PUBLICATIONS

Search Report from Great Britain Application No. GB1200772.0, dated May 18, 2012.
Ericsson; "*Architecture Modifications and Alternatives for Remote Management of USIM Application on M2M Equipment,*", 3GPPTSG SA WG3 Security—S3#50; S3-080163, dated Feb. 2008.
(Continued)

*Primary Examiner* — Kashif Siddiqui
(74) *Attorney, Agent, or Firm* — Stanton IP Law

(57) ABSTRACT

A method, apparatus and computer program product are provided to provide network access credentials and network access to a remote device via a proxy device. In some example embodiments, a method is provided that comprises receiving a request for network access credentials from a remote device. In some example embodiments, the network access credentials comprise identification information related to at least one SIM. The method of this embodiment may also include determining whether network access credentials are available for the remote device. The method of this embodiment may also include causing the network access credentials to be provided to the remote device in an instance in which network access credentials are available for the remote device. In some example embodiments, the network access credentials enable access to a network by the remote device via one or more proxy devices.

20 Claims, 6 Drawing Sheets

(56) References Cited

OTHER PUBLICATIONS

"*3GPP TR 33.812 V1.4.0;*" 3rd Generations Partnership Project; Technical Specification Group Services and System Aspects; Feasibility Study of the Security Aspects of Remote Provisioning and Change of Subscription for M2M Equipment; (Release 9); dated Jun. 2009.

International Search Report for Application No. PCT/IB2013/050489; dated Jun. 14, 2013.

* cited by examiner

METHOD AND APPARATUS FOR NETWORK ACCESS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNOLOGICAL FIELD

Example embodiments of the present invention relate generally to subscriber identity modules (SIMs) and, more particularly, to the provisioning of a SIM on a device not connected to a network.

BACKGROUND

In a Global System for Mobile Communications (GSM) network, a subscriber identity module or subscriber identification module (SIM) and/or in a Universal Mobile Telecommunications System (UTMS) network a SIM or a universal SIM (U-SIM) may be used to provide identification information that enables access to a network. The SIM may take the form of a removable chip that is insertable in a mobile terminal, it may take the form of a chip that is embedded in the mobile terminal and/or it may take the form of a software based SIM e.g. a virtual SIM (VSIM). In cases where a VSIM is used, the content of a traditional SIM card is not necessarily physically stored in a memory of a specific device. In these cases, the SIM card information may reside in a network database which may be accessed to obtain the relevant SIM information.

BRIEF SUMMARY

A method, apparatus and computer program product are therefore provided according to some example embodiments of the present invention in order to enable a remote device to access a subscription database, via a proxy device, in order to retrieve SIM (e.g. VSIM) information for network access. In particular, a remote device may not be configured to communicate with an access point and/or other network entity directly to retrieve SIM information for network access. However, the remote device may still be configured to connect (e.g. device to device communications) with a proxy device in order to operate on a licensed frequency band and/or on a network (e.g. cellular network). In such cases, the remote device may be configured to obtain network access credentials for the network by communicating via the proxy device. The proxy device, in some example embodiments, may be configured to obtain credentials from a subscription database on behalf of the remote device, may operate as a relay (e.g. data pipe) for the remote device, or may have one or more credentials stored in a local memory and may issue those credentials to the remote device. In operation, the remote device may then connect to the proxy device or another proxy device to access the network based on the network access credentials.

In one embodiment, a method is provided that comprises receiving a request for network access credentials from a remote device. In some example embodiments, the network access credentials comprise identification information related to at least one SIM. The method of this embodiment may also include determining whether network access credentials are available for the remote device. The method of this embodiment may also include causing the network access credentials to be provided to the remote device in an instance in which network access credentials are available for the remote device. In some example embodiments, the network access credentials enable access to a network by the remote device via one or more proxy devices.

In another embodiment, an apparatus is provided that includes at least one processor and at least one memory including computer program code with the at least one memory and the computer program code being configured, with the at least one processor, to cause the apparatus to at least receive a request for network access credentials from a remote device. In some example embodiments, the network access credentials comprise identification information related to at least one SIM. The at least one memory and computer program code may also be configured to, with the at least one processor, cause the apparatus to determine whether network access credentials are available for the remote device. The at least one memory and computer program code may also be configured to, with the at least one processor, cause the apparatus to cause the network access credentials to be provided to the remote device in an instance in which network access credentials are available for the remote device. In some example embodiments, the network access credentials enable access to a network by the remote device via one or more proxy devices.

In the further embodiment, a computer program product may be provided that includes at least one non-transitory computer-readable storage medium having computer-readable program instruction stored therein with the computer-readable program instructions including program instructions configured to receive a request for network access credentials from a remote device. In some example embodiments, the network access credentials comprise identification information related to at least one SIM. The computer-readable program instructions may also include program instructions configured to determine whether network access credentials are available for the remote device. The computer-readable program instructions may also include program instructions configured to cause the network access credentials to be provided to the remote device in an instance in which network access credentials are available for the remote device. In some example embodiments, the network access credentials enable access to a network by the remote device via one or more proxy devices.

In yet another embodiment, an apparatus is provided that includes means for receiving a request for network access credentials from a remote device. In some example embodiments, the network access credentials comprise identification information related to at least one SIM. The apparatus of this embodiment may also include means for determining whether network access credentials are available for the remote device. The apparatus of this embodiment may also include means for causing the network access credentials to be provided to the remote device in an instance in which network access credentials are available for the remote device. In some example embodiments, the network access credentials enable access to a network by the remote device via one or more proxy devices.

In one embodiment, a method is provided that comprises receiving a request for network access credentials from a remote device via a proxy device. The method of this embodiment may also include generating network access credentials. In some example embodiments, the network access credentials enable the remote device, in an instance in which the remote device is connect to the proxy device, to connect a network using the network access credentials. The method of this embodiment may also include causing the network access credentials to be transferred to the remote device via the proxy device.

In another embodiment, an apparatus is provided that includes at least one processor and at least one memory including computer program code with the at least one memory and the computer program code being configured, with the at least one processor, to cause the apparatus to at least receive a request for network access credentials from a remote device via a proxy device. The at least one memory and computer program code may also be configured to, with the at least one processor, cause the apparatus to generate network access credentials. In some example embodiments, the network access credentials enable the remote device, in an instance in which the remote device is connect to the proxy device, to connect a network using the network access credentials. The at least one memory and computer program code may also be configured to, with the at least one processor, cause the apparatus to cause the network access credentials to be transferred to the remote device via the proxy device.

In the further embodiment, a computer program product may be provided that includes at least one non-transitory computer-readable storage medium having computer-readable program instruction stored therein with the computer-readable program instructions including program instructions configured to receive a request for network access credentials from a remote device via a proxy device. The computer-readable program instructions may also include program instructions configured to generate network access credentials. In some example embodiments, the network access credentials enable the remote device, in an instance in which the remote device is connect to the proxy device, to connect a network using the network access credentials. The computer-readable program instructions may also include program instructions configured to cause the network access credentials to be transferred to the remote device via the proxy device.

In yet another embodiment, an apparatus is provided that includes means for receiving a request for network access credentials from a remote device via a proxy device. The apparatus of this embodiment may also include means for generating network access credentials. In some example embodiments, the network access credentials enable the remote device, in an instance in which the remote device is connect to the proxy device, to connect a network using the network access credentials. The apparatus of this embodiment may also include means for causing the network access credentials to be transferred to the remote device via the proxy device.

BRIEF DESCRIPTION OF THE DRAWINGS

Figure 1:
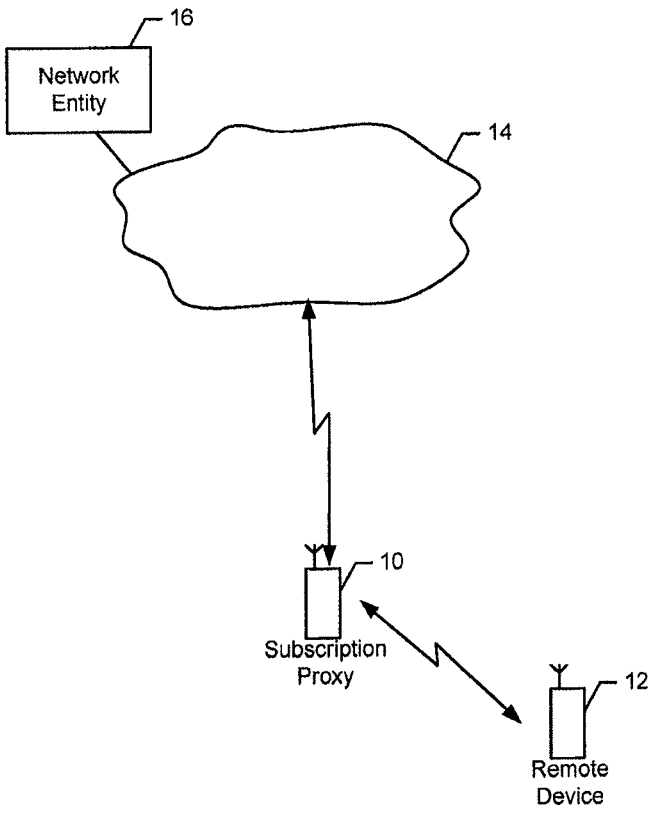
Figure 2:
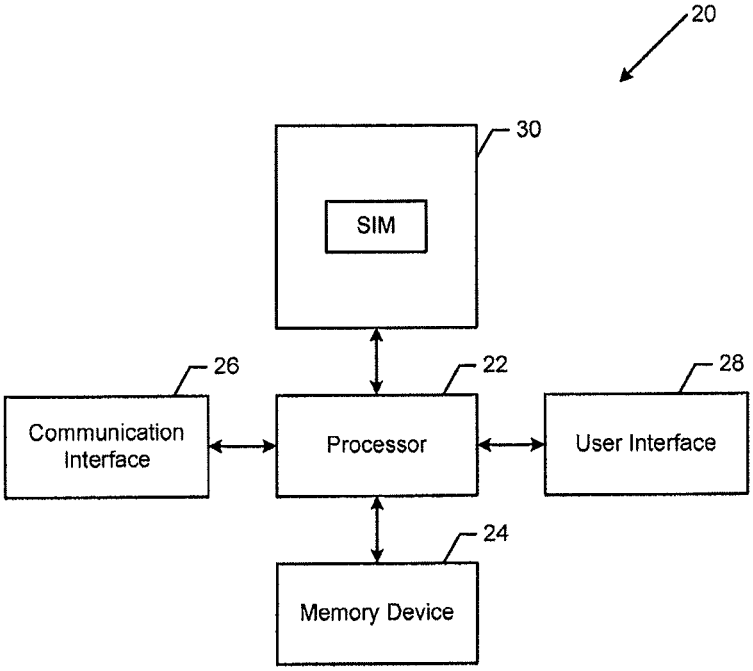
Figure 3:
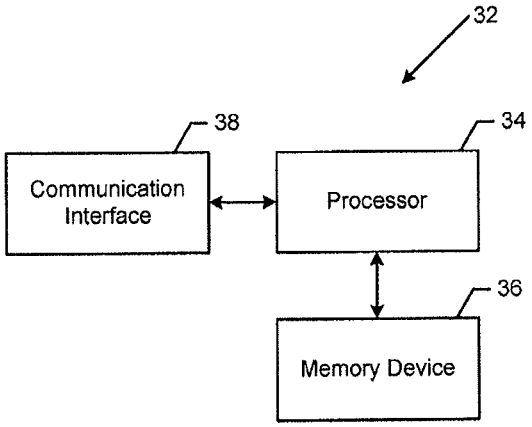
Figure 4:
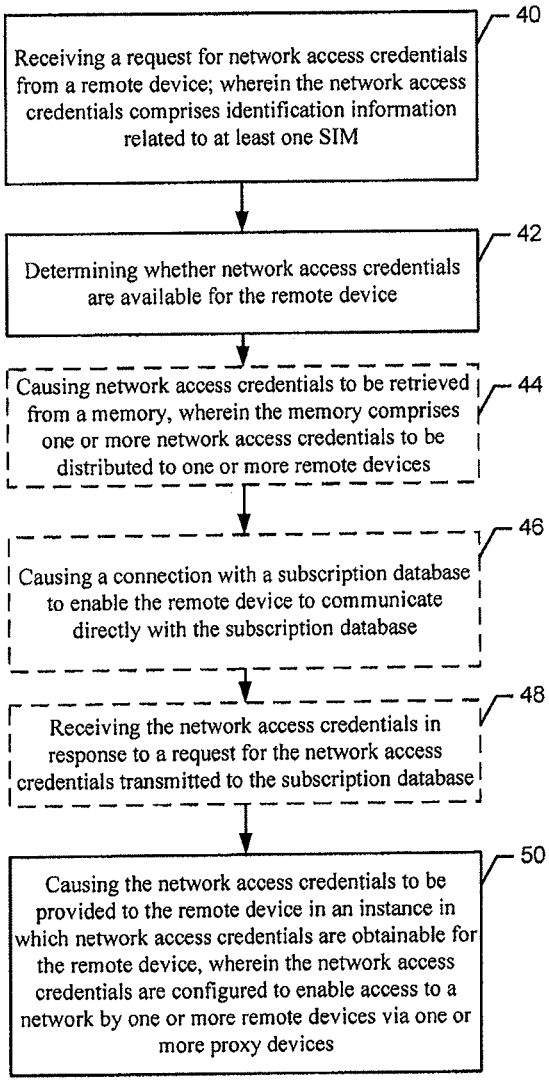
Figure 5:
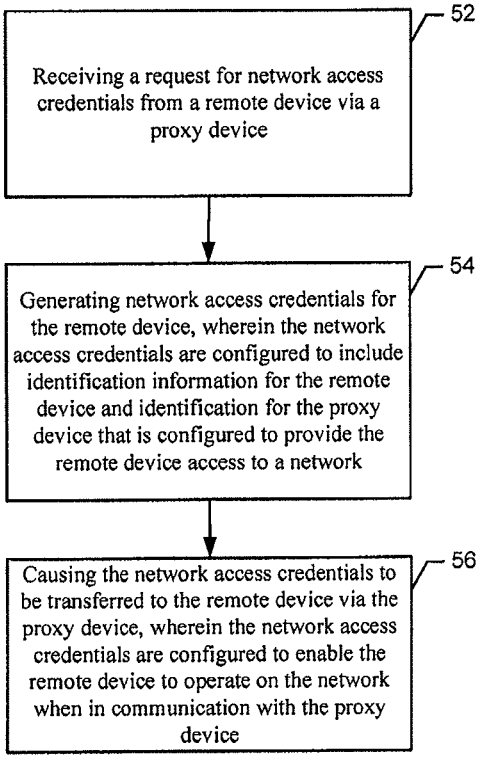
Figure 6:
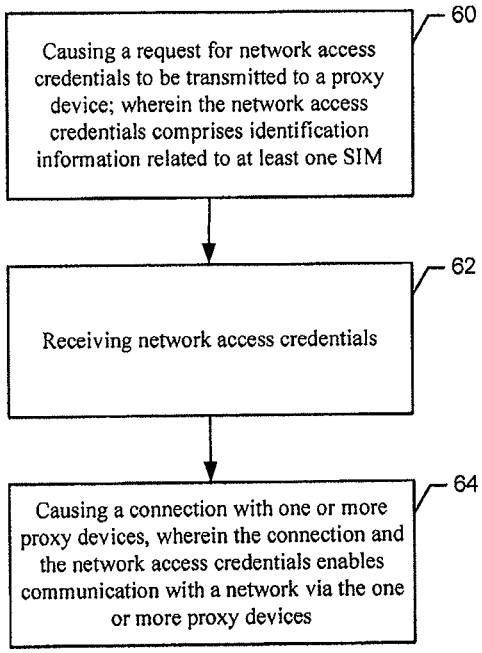

Having thus described certain example embodiments of the present disclosure in general terms, reference will now be made to the accompanying drawings, which are not necessarily drawn to scale, and wherein:

FIG. 1 is an illustration of a system for providing remote device with access to a network via a proxy device in accordance with an example embodiment of the present invention;

FIG. 2 is a block diagram of an apparatus from the perspective of a remote device and/or a proxy device that may be configured in accordance with an example embodiment of the present invention;

FIG. 3 is a block diagram of an apparatus from the perspective of a network entity that may be configured in accordance with an example embodiment of the present invention;

FIG. 4 is a flow chart of the operations performed from the perspective of a proxy device in accordance with an example embodiment of the present invention;

FIG. 5 is a flow chart of the operations performed from the perspective of a network entity in accordance with an example embodiment of the present invention; and FIG. 6 is a flow chart of the operations performed from the perspective of a remote device in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Referring now to FIG. 1, a system for providing a remote device 12 with access to a network 14 via a proxy device 10 is described herein. The remote device 12 may be a device that is not able to communicate with a network access point, such as network entity 16 and/or is not able to directly attach to a local access point (e.g. because of network incompatibility or the like). In some example embodiments, a proxy device 10 and/or a remote device 12 may be configured for, but not limited to, machine type communications (MTC), device to device (D2D) communications, machine to machine (M2M) communications, near field communication (NFC), shortrange communication, e.g., Bluetooth communications, Zigbee communications, Institute of Electrical and Electronics Engineers (IEEE) 802.11 communications and/or the like. The remote device 12 therefore may connect to another device, such as the proxy device 10 in order to connect to the network 14 via the proxy device 10. The proxy device 10 and/or the remote device 12 may be of various types of mobile communication devices such as, for example, mobile telephones, PDAs, pagers, laptop computers, tablets or any of numerous other hand held or portable communication devices, computation devices, content generation devices, content consumption devices, or combinations thereof. The proxy device 10 may communicate via a network 14, such as a Long Term Evolution (LTE) network, an LTE-Advanced (LTE-A) network, an IEEE 802.11 wireless local area network (WLAN), a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. In one example embodiment, the system may also include a network entity 16, such as a subscription database, a server or other computing device, for providing network access credentials to the proxy device 10. However, the system of other embodiments may not include a network entity for providing network access credentials, and the proxy device 10 may be configured to provide the network credentials from a local memory.

Referring now to FIG. 2, an apparatus 20 that may be embodied by or otherwise associated with a proxy device 10 and or a remote device 12 may include or otherwise be in communication with a processor 22, a memory device 24, a communication interface 26, a user interface 28 and a circuit card or other secure module 30 or other type of secure memory for storing a plurality of SIMs. A SIM, such as a CDMA SIM (CSIM), a USIM, an interne protocol (IP) multimedia subsystem (IMS) SIM (ISIMs), a removable user identify module (RUIM), a VSIM or the like, may store or be configured to store the network access application (NAA) that includes the cryptographic network access credentials that allows use of at least some of the services of the communication service provider. The NAA may be stored on a removable module or a non-removable module, e.g., a surface mounted or embedded chip.

In some example embodiments, the processor 22 (and/or co-processors or any other processing circuitry assisting or otherwise associated with the processor) may be in communication with the memory device 24 via a bus for passing information among components of the apparatus 20. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 20 may, in some embodiments, be embodied by a proxy device 10 and or a remote device 12. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a proxy device 10 and/or a remote device 12, the processor may be embodied by the processor of a proxy device 10 and/or a remote device 12.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a proxy device 10 and/or a remote device 12) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network 14 and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a proxy device 10 and/or a remote device 12, the apparatus may include a user interface 28 that may, in turn, be in communication with the processor 22 to receive an indication of a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device and/or the like).

Further, the circuit card or other secure module 30 or other type of secure memory may be configured to store a plurality of SIMs, as described herein. The SIMs may be software SIMs or VSIMs of various types including, for example, CSIMs, USIMs, RUIMs and ISIMs. In one example embodiment, the circuit card is embodied by a universal integrated circuit card (UICC), an embedded UICC (eUICC) or the like in order to store the SIMs to facilitate identification and authentication of the user of a proxy device 10 and or a remote device 12. In this regard, a SIM may include network access credentials that may include buy are not limited to: a unique serial number (ICCID) or other permanent identifier, an international mobile subscriber identity (IMSI), security authentication and ciphering information, temporary information related to the local network, a list of the services to which the user has access and/or passwords. The SIMs may be mapped to various subscriber identification numbers that identify the proxy device 10 or the remote device 12 and/or the user of the proxy device 10 or the remote device 12. For example, the plurality of SIMs may be mapped to different mobile station integrated services digital network numbers (MSISDNs). In one example, the first SIM may be mapped to an MSISDN that is associated with a private subscription of the user, e.g., the user's personal telephone number, while the second SIM is mapped to a different MSISDN that is associated with a data subscription.

Referring now to FIG. 3, an apparatus 32 that may be embodied by or otherwise associated with a network entity 16 for providing network access credentials and which may include or otherwise be in communication with a processor 34, a memory device 36 and a communication interface 38. In some example embodiments, the processor (and/or co-processors or any other processing circuitry assisting or otherwise associated with the processor) may be in communication with the memory device via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 32 may, in some example embodiments, be embodied by a network entity 16, such as a server or other computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 34 may be embodied in a number of different ways. For example, the processor may be embodied as one or more of various hardware processing means such as a coprocessor, a microprocessor, a controller, a DSP, a processing element with or without an accompanying DSP, or various other processing circuitry including integrated circuits such as, for example, an ASIC, an FPGA, a MCU, a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 32 is embodied as a network entity 16, the processor may be embodied by the processor of the network entity, such as the processor of a server or other computing device.

In an example embodiment, the processor 34 may be configured to execute instructions stored in the memory device 36 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a network entity 16) configured to employ an embodiment of the present invention by further configuration of the processor by instructions for performing the algorithms and/or operations described herein. The processor may include, among other things, a clock, an ALU and logic gates configured to support operation of the processor.

Meanwhile, the communication interface 38 may be any means such as a device or circuitry embodied in either hardware or a combination of hardware and software that is configured to receive and/or transmit data from/to a network 14 and/or any other device or module in communication with the apparatus 32. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, DSL, USB or other mechanisms.

FIG. 4 is a flow chart of the operations performed from the perspective of a proxy device 10 in accordance with an example embodiment of the present invention. As is shown with reference to FIG. 1, a remote device 12 may be configured to access a network via a proxy device 10. In some cases, the remote device 12 may not be configured to communicate directly with an access point or an enhance node B (eNB). However the remote device may be configured to communicate with a proxy device 10. The proxy device 10, however, may be configured to communicate with a network entity 16 and ultimately with a subscription database. As is described herein, the remote device 12 may be in communication with the proxy device 10 via the following non-exhaustive list of available interfaces: LTE D2D interface, GSM, WCDMA, 2G or 3G interface, 802.11 interface, NFC, or equivalent proximity communication interface, Bluetooth, Zigbee or equivalent sensor networking radio.

As shown in operation 40, the apparatus 20 embodied, for example, by a proxy device 10, may comprise means, such as the processor 22, the communications interface 26, or the like, for receiving a request for network access credentials from the remote device 12. In some embodiments the network access credentials may comprise identification information related to at least one SIM, such as an IMSI or the like.

As shown in operation 42, the apparatus 20 embodied, for example, by a proxy device 10, may comprise means, such as the processor 22, the communications interface 26, or the like, for determining whether network access credentials are available for the remote device. In some example embodiments, the proxy device 10, may determine, such as by the processor 22, the method in which network access credentials may be retrieved. For example, in some example embodiments, the network access credentials may be stored in a memory 24. See operation 44.

In example embodiments and in an instance in which there are one or more network access credentials either stored in the memory 24 of the proxy device 10 or accessible via the communications interface 26, the proxy device 10 may cause the network access credentials to be issued to the remote device 12. The proxy device 10 may also be configured to distribute stored credentials to other remote devices. In these example embodiments, the proxy device 10 may operate similar to a mobile hotspot. For example, a user of the proxy device 10 may operate a plurality of remote devices and thus may want provision each one of those devices to access a network via the same proxy device 10 under a same user account (e.g. for billing purposes).

Alternatively or additionally, the proxy devices 10 may be configured to verify that the remote device 12 is permitted to access the network 14. In some example embodiments, verification is based on at least one of a communication received from a subscription database or identification information stored in the memory 24.

In other example embodiments, the proxy device 10 may operate as a relay. As shown in operation 46, the apparatus 20 embodied, for example, by a proxy device 10, may comprise means, such as the processor 22, the communications interface 26, or the like, for causing a connection with a subscription database to enable the remote device to communicate directly with the subscription database. For example, the proxy device 10 may act as a data pipe, relay, access point or the like to enable the remote device 12 to communicate directly with the network entity, for example, in order to obtain network access credentials.

In other example embodiments, the proxy device 10 may be configured to obtain network access credentials from a network entity 16, such as the subscription database, and may further be configured to provide those credentials to the proxy device 10. In particular, the proxy device 10, such as via the processor 22, may generate a request for the network access credentials for transmission to a subscription database. As shown in operation 48, the apparatus 20 embodied, for example, by a proxy device 10, may comprise means, such as the processor 22, the communications interface 26, or the like, for receiving the network access credentials in response to a request for the network access credentials transmitted to the subscription database. In further example embodiments, the proxy device 10, such as via the processor 22, the communications interface or the like, may cause a message to be transmitted to the subscription database indicating an identity of one or more connected remote devices 12.

Alternatively or additionally, in some example embodiments, the remote device 12 may connect to the subscriptions database. In such cases, the remote device 12 may receive temporary network access credentials. The proxy device 10 may then cause, such as by the processor 22, the network access credentials to be activated. In some example embodiments and in an instance in which the network access credentials are activated, the remote device 12 may be enabled to utilize the network access credentials to connect to the network 14 via one or more proxy devices, such as proxy device 10.

As shown in operation 50, the apparatus 20 embodied, for example, by a proxy device 10, may comprise means, such as the processor 22, the communications interface 26, or the like, for causing the network access credentials to be provided to the remote device 12 in an instance in which network access credentials are available for the remote device 12. For example the network access credentials may be available in an instance in which they were accessible from the memory 24 of the proxy device 10, they were received from the network entity 16 and/or the like.

In some example embodiments, the network access credentials are configured to enable access to a network 14 by one or more remote devices 12 via one or more proxy devices 10. The remote device 12, in some example embodiments, is configured to access the network using the proxy device 10, as a connection, as a data pipe, as a proxy, as an access point, and/or the like, to enable access to the network. In order to access the network via the proxy device 10, the remote device may cause the network access credentials to be provided to the proxy device. Once connected to the network via the proxy device 10, the remote device 12 may have access to various services and data that would be available to the proxy device 10 and/or may have access to a subset of services that are available to the proxy device 10. For example, the remote device 12 may be configured to access the Internet, send messages and/or the like.

FIG. 5 is a flow chart of the operations performed from the perspective of a network entity 16, such as a subscription database, in accordance with an example embodiment of the present invention. In some example embodiments, the subscription database may be implemented on a network entity 16 and configured to provide network access credentials to remote devices 12. The subscription database may further be configured to provide cellular provisioning data for the remote device 12. The subscription database may also be available via various wireless networks as described herein, or may be accessible via a provisioning network. The subscription database may be monitored and/or managed by a network operator in some embodiments.

As shown in operation 52, the apparatus 20 embodied, for example, by a network entity 16, may comprise means, such as the processor 34, the communications interface 38, or the like, for receiving a request for network access credentials from a remote device 12 via a proxy device 10. In response to the request, the network entity 16, such as the subscription database, may generate, using the processor 34, network access credentials for the remote device 12. See operation 54. In some example embodiments, the network access credentials are configured to include identification information for the remote device 12 and identification for the proxy device 10 that may enable access to a network 14. For example the remote device 12 may be configured to access the network 14 via a particular proxy device 10 and thus may include identification information relating that proxy device 10 in its network access credentials. In other embodiments, the network entity 16 may also track both the identification information for the remote device 12 and proxy device 10 for billing purposes and/or for security related purposes.

In some example embodiments, the operator of the subscription database may be configured to bill and charge for particular services on the network 14 by determining identity and billing information assigned to a remote device 12 when connected to the network. Alternatively or additionally the proxy device 10 may be billed for enabling access to the network.

As shown in operation 56, the apparatus 20 embodied, for example, by a network entity 16, may comprise means, such as the processor 34, the communications interface 38, or the like, for causing the network access credentials to be transferred to the remote device via the proxy device. In some example embodiments, the network access credentials are configured to enable the remote device 12 to operate on the network 14 when in communication with the proxy device 10.

FIG. 6 is a flow chart of the operations performed from the perspective of a remote device in accordance with an example embodiment of the present invention. The remote device 12 may be configured to detect, locate, or otherwise connect to a proxy device 10 in order to connect to a network. As shown in operation 60, the apparatus 20 embodied, for example, by a remote device 12, may comprise means, such as the processor 22, the communications interface 26, or the like, for causing a request for network access credentials to be transmitted to a proxy device. In some example embodiments, the network access credentials comprise identification information related to at least one SIM.

As shown in operation 62, the apparatus 20 embodied, for example, by a remote device 12, may comprise means, such as the processor 22, the communications interface 26, or the like, for receiving network access credentials. As shown in operation 64, the apparatus 20 embodied, for example, by a remote device 12, may comprise means, such as the processor 22, the communications interface 26, or the like, for causing a connection with one or more proxy devices. In some example embodiments, the connection and the network access credentials enable communication with a network via the one or more proxy devices.

As described above, FIGS. 4-6 illustrate a flowchart of an apparatus, method, and computer program product from the perspective of a proxy device 10, remote device 12 and a network entity 16, respectively, according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the dashed boxes in FIG. 4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:

receiving a request for network access credentials from a remote device; wherein the network access credentials comprise identification information related to at least one subscriber identity module (SIM);

determining, using a processor, whether network access credentials are available for the remote device; and causing the network access credentials to be provided to the remote device in an instance in which network access credentials are available for the remote device, wherein the network access credentials enable access to a network by the remote device, wherein said access to the network is via one or more proxy devices.

2. A method according to claim 1, further comprising:

causing network access credentials to be retrieved from a memory, wherein the memory comprises one or more network access credentials to be distributed to one or more remote devices.

3. A method according to claim 2, further comprising:

verifying that the remote device is permitted to access the network; wherein verification is based on at least one of a communication received from a subscription database or identification information stored in the memory.

4. A method according to claim 1, further comprising:

generating a request for the network access credentials for transmission to a subscription database; and receiving the network access credentials in response to a request for the network access credentials transmitted to the subscription database.

5. A method according to claim 4, further comprising:

causing the network access credentials to be activated; wherein in an instance in which the network access credentials are activated, the remote device is enabled to utilize the network access credentials to connect to the network via one or more proxy devices.

6. A method according to claim 1, further comprising:

causing a connection with a subscription database to enable the remote device to communicate directly with the subscription database.

7. A method according to claim 1, further comprising:

causing information relating one or more connected remote devices to be transmitted to a subscription database.

8. An apparatus comprising:

at least one processor; and at least one memory including computer program code, the at least one memory and the computer program code configured to, with the at least one processor, cause the apparatus to at least:

receive a request for network access credentials from a remote device; wherein the network access credentials comprise identification information related to at least one subscriber identity module (SIM);

determine whether network access credentials are available for the remote device; and cause the network access credentials to be provided to the remote device in an instance in which network access credentials are available for the remote device, wherein the network access credentials enable access to a network by the remote device, wherein said access to the network is via one or more proxy devices.

9. An apparatus according to claim 8, wherein the at least one memory including the computer program code is further configured to, with the at least one processor, cause the apparatus to:

cause network access credentials to be retrieved from a memory, wherein the memory comprises one or more network access credentials to be distributed to one or more remote devices.

10. An apparatus according to claim 9, wherein the at least one memory including the computer program code is further configured to, with the at least one processor, cause the apparatus to:

verify that the remote device is permitted to access the network; wherein verification is based on at least one of a communication received from a subscription database or identification information stored in the memory.

11. An apparatus according to claim 8, wherein the at least one memory including the computer program code is further configured to, with the at least one processor, cause the apparatus to:

generate a request for the network access credentials for transmission to a subscription database; and receive the network access credentials in response to a request for the network access credentials transmitted to the subscription database.

12. An apparatus according to claim 11, wherein the at least one memory including the computer program code is further configured to, with the at least one processor, cause the apparatus to:

causing the network access credentials to be activated; wherein in an instance in which the network access credentials are activated, the remote device is enabled to utilize the network access credentials to connect to the network via one or more proxy devices.

13. An apparatus according to claim 8 wherein the at least one memory including the computer program code is further configured to, with the at least one processor, cause the apparatus to:

cause a connection with a subscription database to enable the remote device to communicate directly with the subscription database.

14. An apparatus according to claim 8, wherein the at least one memory including the computer program code is further configured to, with the at least one processor, cause the apparatus to:

cause information relating one or more connected remote devices to be transmitted to a subscription database.

15. A method comprising:

receiving a request for network access credentials from a remote device via a proxy device;

generating, using a processor, network access credentials, wherein the network access credentials enable the remote device, in an instance in which the remote device is connected to the proxy device, to connect to a network using the network access credentials; and causing the network access credentials to be transferred to the remote device via the proxy device, wherein the network access credentials enable access to a network by the remote device, wherein said access to the network is via the proxy device.

16. A method according to claim 15, wherein the network access credentials are configured to enable the remote device to operate on the network when in communication with the proxy device.

17. A method according to claim 15, wherein the proxy device is configured to activate the network access credentials.

18. A method according to claim 15, further comprising:

determining whether the remote device has accessed one or more services based on the network access credentials, wherein the network access credentials are used to generate billing information for the remote device.

19. A method according to claim 15, further comprising:

causing a security related parameter to be assigned to the remote device.

20. A method according to claim 15, wherein the network access credentials are configured to include identification information for the remote device and identification for the proxy device and comprise identification information related to at least one subscriber identity module (SIM).

* * * * *